July 9, 1946.  C. B. SCHNEIBLE  2,403,830
ENTRAINMENT SEPARATOR
Filed May 20, 1943
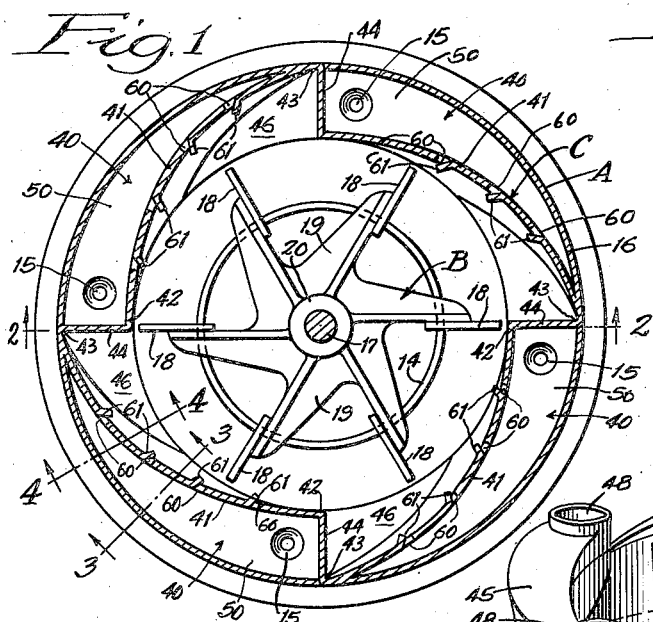
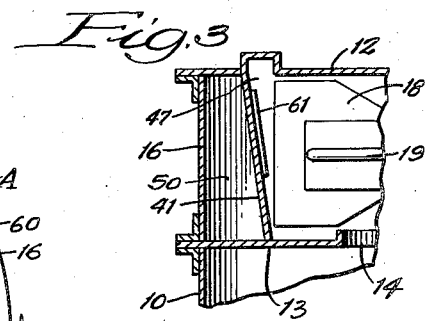
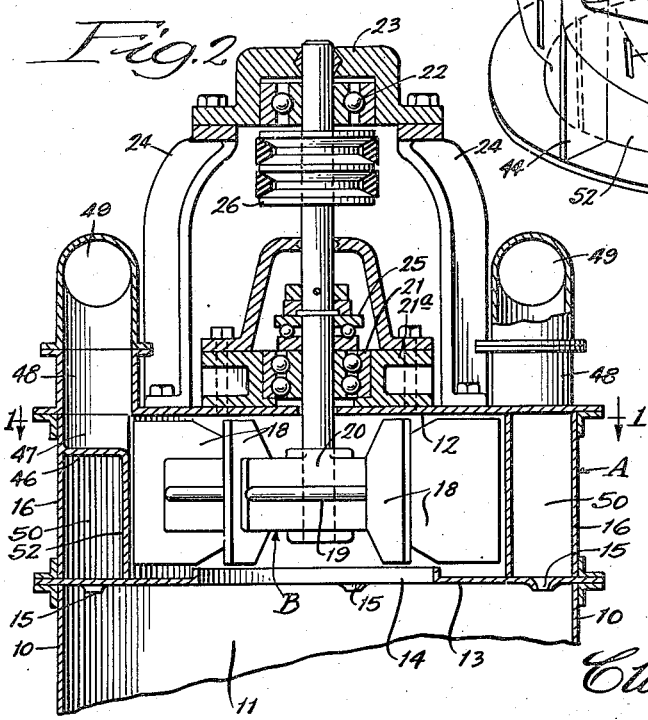
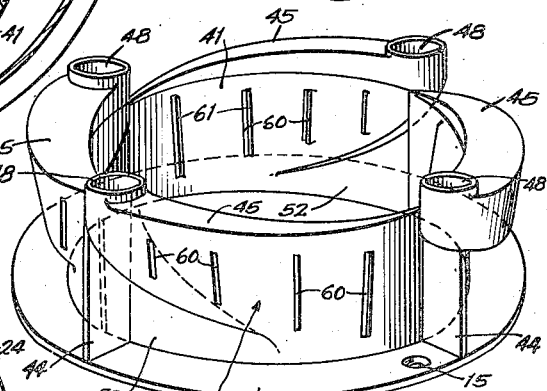
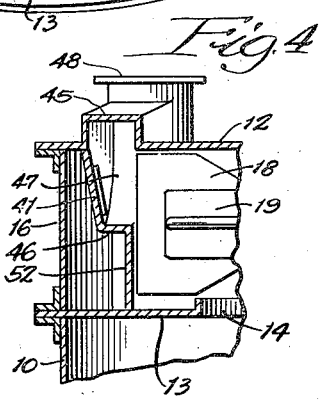
Inventor:
Claude B. Schneible,
By Dawson Ooms & Booth
Attorneys.

Patented July 9, 1946

2,403,830

UNITED STATES PATENT OFFICE 2,403,830

ENTRAINMENT SEPARATOR

Claude B. Schneible, Detroit, Mich.

Application May 20, 1943, Serial No. 487,687

6 Claims. (Cl. 183—77)

This invention relates to an entrainment separator, and more particularly to apparatus for separating moisture or the like from air or other gases.

An object of the invention is to provide apparatus which is effective and efficient for removing entrained matter and/or liquid particles in a gas or air stream, and which is compact and simple of construction.

More specifically, an object is to provide an entrainment separator which employs a fan to impart rotational velocity to the gases being treated, and which utilizes efficient baffle means for separating the entrained matter thrown out by the fan while causing the gases freed from such matter to pass on through the apparatus. Another object is to provide a device in which the portion of the gases which are thrown out with the entrained matter is recirculated and again subjected to the separation treatment.

Other objects of the invention will be apparent as the specification proceeds.

The invention will be more fully understood in connection with the following detailed description of one embodiment, having reference to the accompanying drawing, in which—

Fig. 1 is a horizontal sectional view of one form of the improved apparatus, the section being taken as indicated at line 1—1 of Fig. 2; Fig. 2 is a vertical sectional view taken as indicated at line 2—2 of Fig. 1; Fig. 3 is a detail sectional view taken radially of the casing, as indicated at line 3—3 of Fig. 1; Fig. 4 is a detail sectional view taken radially of the casing, as indicated at line 4—4 of Fig. 1; and Fig. 5 is a perspective view of the device with the fan and top and side plates removed to expose the baffle and duct systems.

As illustrated, A designates a casing which encloses a fan B, and C designates baffle means by which the entrained matter thrown out by the fan is passed away separately of the gases.

In the illustrated embodiment, the casing A is set upon cylindrical walls 10 which form the conduit or compartment 11 from which the gas to be treated is withdrawn. The casing A is made up of a top plate 12 and a bottom plate 13, both of circular contour. The bottom plate 13 is provided with a centrally-located circular opening 14 through which air, for example, passes into the casing from compartment 11, and is provided also with the apertures 15 near its periphery through which matter previously entrained in the air is returned in separated form.

Secured to bottom plate 13 are the cylindrical walls 16 which form the sides of the casing. Top plate 12 is secured to walls 16 at its edges, and at its center has an opening through which the fan shaft 17 is received.

The fan B, disposed centrally within the casing, includes any suitable number of blades and, as illustrated, is equipped with six blades 18 which extend radially from the fan's axis of rotation and are supported on the web member 19 extending from hub 20. The hub 20 is secured to the shaft 17 which extends through the plate 12. This fan may be of any desired specific design so long as it is adapted to draw gas through the central inlet opening of the casing and cause it to rotate and so be thrown radially outward.

Above plate 12, the shaft 17 is received within the ball bearings 21 and 22. The stationary portion of bearing 21 is secured to plate 12 by means of the member 21ª, and the stationary part of bearing 22 is secured to head 23 which is bolted to the standards 24 which are, in turn, bolted to plate 12. A thrust bearing 25 supports the weight of the fan and shaft.

The shaft 17 has mounted on it a pulley 26 through which the shaft may be driven by any suitable source of power.

It is, of course, understood that any suitable type of mounting for the fan shaft and any suitable drive means for rotating it may be employed.

The baffle means C within the casing may include any suitable number of separating sections. For example, four separating sections designated by the characters 40 may be provided. These sections are substantially identical and each is disposed in a quadrant of the cylindrical casing. Any number of such sections may be employed as may be desired; for example, three sections might be employed, in which case each section would occupy 120°.

Each of sections 40 includes a wall 41 which extends in curved fashion from a point 42 inward of the cylindrical wall 16 to a point 43 at the wall 16. The curvature of walls 41 is preferably that of an epicycloid. The point 42 is just outside the periphery of the fan B, and extending from this point to the outer wall of the casing are the radially-disposed "cut off" plates 44. As is seen more clearly in Figs. 3 and 4, the walls 41 are preferably inclined somewhat with the vertical at points where this is possible while still clearing the fan periphery.

The top and bottom segments 45 and 46 in each of the sections cooperate with wall 41 to form ducts 47 through which gases pass. Preferably, the bottom segments 46 curve upwardly in the form of an epicycloidal curve corresponding with the curve of walls 41 in a horizontal plane, and segments 45 may be inclined upwardly toward the outlet ports 48, if desired.

With such construction, it will be observed that the gas ducts 47 formed by walls 41 and segments 45 and 46 are open on their inner sides. With gas being rotated and urged outwardly through rotation of the fan, the gas will slip along the walls 41 and pass upwardly through the ducts 47 to the outlet openings 48. The ducts 47 increase in their dimension radially of the casing toward the outlets, but due to the curvature of bottom segments 46, their vertical dimensions decrease toward the oultets in about the same proportion, so the overall effect is to provide a duct of substantially uniform cross sectional area.

The device may be equipped with a variable cutoff, and the length and depth of the passages may be of suitable dimensions, although the dimensions illustrated are to be preferred. If desired, the walls 52 may also be equipped with vertical slots therein.

The outlets 48 may be left open to the atmosphere or may be connected with conduit 49 through which the gases are carried away.

Between walls 41 and the outer wall 16 of the casing are the chambers 50 for withdrawal of the matter which was once entrained in the gases being treated. Openings 15 provide the means for withdrawing the separated matter from the ducts or chambers 50. Below the curved bottom of ducts 47 and joining with the inner edges of segments 46 are the curved pieces 52 which serve to prevent passage of gases from the fan into these chambers 50.

The walls 51 which divide the gas ducts 47 and the withdrawal chambers 50 are provided with vertical slots 60 adjacent which are the inturned edges 61 which serve as baffle members to catch entrained matter which may be sliding along these walls and to pass such matter through the slots.

The casing A may be regarded as providing a fan chamber in which the fan is disposed and one or more chambers 50 for withdrawal of separated entrained matter, the fan chamber and the chambers 50 being separated by the walls 41 having the perforations 60.

The improved device is well adapted for separating entrained matter of various kinds, particularly liquids or solids from gases of any kind, and is especially suitable for the removal of moisture from air. In the following explanation of its operation, reference will be had to the separation of moisture from air.

When the power is turned on and the fan B is rotated by the drive through pulley 26 and shaft 17, air which is laden with moisture and disposed in chamber 11 is drawn through the opening 14 in plate 13 to the fan chamber. Inside this chamber, the moisture-laden air is caused by the blades 18 to rotate very rapidly. The entrained moisture, being heavier, is quickly thrown by centrifugal force against the walls 41, while the air, freed of moisture, passes along these walls through the ducts 47 and out through the outlets 48.

The water collecting on walls 41 is moved by the passing air to the slots 60 where it is caught by baffles 61 and passed through the slots into chambers 50 from which it is withdrawn through the holes 15. A certain proportion of the gas or air passes through the slot 60 with the entrained matter. The passage of this air through the slot serves to facilitate the movement of the entrained matter therethrough. The proportion of air which passes through may be controlled or adjusted by the design of the device. Normally, only a small quantity of air passes through, but as high as 40% may pass through the slot 60.

The air which passes through the slot 60 passes downwardly through the holes 15 into the compartment 11 and from this compartment is again passed into the fan chamber. In this manner, any air which passes through the slot 60 is recirculated through the device and again subjected to the separation treatment.

The air which leaves the fan periphery and passes along walls 41 moves at substantially the same speed until it leaves the outlets 48 because of the substantial uniformity of the area of ducts 47. This eliminates "bottlenecks" and makes separation effective along the whole length of walls 41. Also, since the ducts 47 lead in an upward direction, the heavier separated entrained matter is held by the force of gravity from being passed out along with the gases.

The whole mechanism is simple and compact, being confined in a relatively small space. It can readily be connected with its inlet to any supply of gases containing entrained matter, and will deliver a constant current of gas freed of its entrained matter in large quantity. The entrained matter which is separated from the gas may be directed back to the source of gas supply, as in the embodiment herein specifically described, or may be arranged to deliver such matter to any desired location.

By "entrained matter" as the term is used herein, solids and/or liquids which are suspended in a gaseous medium are intended to be included.

The foregoing detailed description of one embodiment and the explanation of operation in connection with the removal of moisture from air, is given for the purpose of explanation only, and no limitations are intended, it being understood that the details of construction may vary widely and the apparatus be employed in connection with various types of gases containing entrained matter.

I claim:

1. Apparatus for the separation of entrained matter from gases, comprising a casing having an inlet opening, a horizontal rotary fan within said casing and adapted to impart rotary motion to gases entering said inlet, baffle means within said casing and disposed radially outwardly of the periphery of said fan and capable of receiving therethrough entrained matter thrown outwardly of said fan, and a wall providing with said casing a passage of substantially uniform cross sectional area leading upwardly from the periphery of said fan for conducting from said casing the gases which pass said baffle means.

2. Apparatus for the separation of entrained matter from gases, comprising a rotary fan, a casing enclosing said fan and having inlet and outlet openings, said fan being adapted to impart rotary motion to gases passing through said casing, a wall providing with said casing a passage forming a curved path from the periphery of said fan to a casing outlet opening and through which gases may pass to said outlet opening, said passage being substantially uniform in cross sectional area, said passage having an outer wall which is provided with apertures through which entrained matter thrown outwardly by said fan may pass, and a passage on the opposite side of said wall from said passage for withdrawing entrained matter from said casing.

3. Apparatus for the separation of entrained matter from gases, comprising a rotary fan, a casing enclosing said fan and having inlet and outlet openings, said fan being adapted to impart rotary motion to gases passing through said casing, a wall providing with said casing a passage forming an outwardly curved path from the periphery of said fan to a casing outlet opening, said passage having an outer wall provided with apertures through which entrained matter thrown outwardly by said fan may pass, the inner side of said passage communicating with the periphery of said fan and the cross sectional area of said passage being substantially uniform along its length, said passage being adapted to conduct gases along said wall and to said casing outlet opening, and a passage on the opposite side of said wall from said passage for withdrawing entrained matter from said casing.

4. Apparatus for the separation of entrained matter from gases, comprising a rotary fan rotatable about a vertical axis, a casing enclosing said fan and having an inlet opening in the lower portion thereof and an outlet opening in the upper portion thereof, said fan being adapted to impart horizontal rotary motion to gases passing through said casing, a wall providing with said casing a passage forming an outwardly curved path from the periphery of said fan to said casing outlet opening, said passage having an outer wall provided with apertures through which entrained matter thrown horizontally outwardly by said fan may pass, the inner side of said passage communicating with the periphery of said fan and the cross-sectional area of said passage being substantially uniform along its length, said passage being adapted to conduct gases along said wall and to said casing outlet openings, and a passage on the opposite side of said wall from said passage for withdrawing entrained matter from said casing.

5. Apparatus for the separation of entrained matter from gases, comprising a rotary fan rotatable about a vertical axis, a casing enclosing said fan and having inlet and outlet openings, said fan being adapted to impart horizontal rotary motion to gases passing through said casing, a wall providing with said casing a passage forming an outwardly and upwardly spirally curved path from the periphery of said fan to said casing outlet opening, said passage having an outer wall disposed radially outwardly of the periphery of the fan and provided with apertures through which entrained matter thrown horizontally outwardly by said fan may pass, the inner side of said passage communicating with the periphery of said fan and the cross-sectional area of said passage being substantially uniform along its length, said passage being adapted to conduct gases along said wall and to said casing outlet openings, and a passage on the opposite side of said wall from said first-mentioned passage for withdrawing entrained matter from said casing.

6. Apparatus for the separation of entrained matter from gases, comprising a casing providing a fan chamber, a rotary fan within said chamber and adapted to impart rotary motion to gases passing through said chamber, a wall of said chamber opposite the periphery of said fan which extends spirally outwardly with respect to the fan periphery and which is provided with apertures for receiving entrained matter therethrough when thrown against said wall by the action of said fan, a second wall connecting said casing and the top of said first-mentioned wall, said first-mentioned wall providing with said casing and second wall a passage forming a curved path from the periphery of said fan to a casing outlet opening, said passageway being substantially uniform in cross section area, said casing also providing a passage for withdrawing entrained matter passing through said apertures, and outlet means for passing from said fan chamber the gases which pass said wall.

CLAUDE B. SCHNEIBLE.